US011897503B2

(12) United States Patent
Guo et al.

(10) Patent No.: US 11,897,503 B2
(45) Date of Patent: Feb. 13, 2024

(54) METHOD AND APPARATUS FOR DETECTING UNEXPECTED CONTROL STATE IN AUTONOMOUS DRIVING SYSTEM

(71) Applicant: Baidu.com Times Technology (Beijing) Co., Ltd., Beijing (CN)

(72) Inventors: Shengjian Guo, Sunnyvale, CA (US); Zhisheng Hu, Sunnyvale, CA (US); Zhenyu Zhong, Sunnyvale, CA (US); Kang Li, Sunnyvale, CA (US)

(73) Assignee: Baidu.com Times Technology (Beijing) Co., Ltd., Beijing (CN)

( * ) Notice: Subject to any disclaimer, the term of this patent is extended or adjusted under 35 U.S.C. 154(b) by 191 days.

(21) Appl. No.: 17/446,814

(22) Filed: Sep. 2, 2021

(65) Prior Publication Data
US 2021/0394788 A1 Dec. 23, 2021

(51) Int. Cl.
*B60W 60/00* (2020.01)
*B60W 30/18* (2012.01)

(52) U.S. Cl.
CPC .. *B60W 60/0011* (2020.02); *B60W 30/18018* (2013.01); *B60W 30/18027* (2013.01);
(Continued)

(58) Field of Classification Search
CPC ......... G05D 1/0088; G05D 2201/0213; G05D 1/0055; G05D 1/027; G05D 1/02; G05D 1/0268; G05D 1/106; G08G 1/166; G08G 1/0112; G08G 1/096725; G08G 1/163; G08G 1/162; G08G 1/09623; B60W 30/0956; B60W 60/001; B60W 10/20; B60W 10/18; B60W 60/0015; B60W 40/02; B60W 30/08; B60W 30/0953; B60W 2050/0005; B60W 30/18154; B60W 40/10; B60W 60/00; B60W 60/0011;
(Continued)

(56) References Cited

U.S. PATENT DOCUMENTS 11,332,165 B2 * 5/2022 Akash ............... B60W 60/0059
2020/0174486 A1 * 6/2020 Luo ....................... G05D 1/0088

FOREIGN PATENT DOCUMENTS

WO WO-2020243484 A1 * 12/2020 .......... B60W 30/146

* cited by examiner

*Primary Examiner* — Adam R Mott
*Assistant Examiner* — Erick T. Detweiler
(74) *Attorney, Agent, or Firm* — Knobbe, Martens, Olson & Bear, LLP

(57) ABSTRACT

The disclosure describes various embodiments for detecting an unexpected control state of an autonomous driving system. According to an embodiment, an exemplary method of detecting an unexpected control state of an autonomous driving system include the operations of generating environmental data of a vehicle; determining, by the autonomous driving system, a first control state based on the environmental data of the vehicle; determining, by a reference model, a second control state based on the environmental data, wherein the reference model defines at least one scenario each corresponding to a plurality of expected control states and a state switching condition, and in each of the expected control states corresponding to the scenario, an action of the vehicle in the scenario obeys a traffic rule; and determining the unexpected control state of the autonomous driving system by comparing the first control state with the second control state.

11 Claims, 14 Drawing Sheets

(52) U.S. Cl.
CPC ... *B60W 30/18109* (2013.01); *B60W 30/18159* (2020.02); *B60W 30/18163* (2013.01); *B60W 60/0018* (2020.02); *B60W 2520/04* (2013.01); *B60W 2555/60* (2020.02); *B60W 2754/10* (2020.02)

(58) Field of Classification Search
CPC ....... B60W 30/18159; B60W 60/0018; B60W 30/18018; B60W 30/18027; B60W 30/18109; B60W 30/18163; B60W 2754/10; B60W 2555/60; B60W 2520/04
See application file for complete search history.

METHOD AND APPARATUS FOR DETECTING UNEXPECTED CONTROL STATE IN AUTONOMOUS DRIVING SYSTEM

TECHNICAL FIELD

Embodiments of the present disclosure relate generally to autonomous vehicles. More particularly, embodiments of the disclosure relate to detecting an unexpected control state in an autonomous driving system.

BACKGROUND

Autonomous driving vehicle, is the intelligent vehicle that leverages the real-time cooperation of hardware sensors and software controller to understand the surroundings and drive safely with little or no human interventions. It is commonly believed that safety is the key to the successful delivery of autonomous driving vehicle to the public transportation. Hence, autonomous driving vehicles must undergo large-scale road testing in real-world traffic before the mass production and commercialization.

SUMMARY

In a first aspect, embodiments of the present disclosure provide a computer-implemented method for detecting an unexpected control state of an autonomous driving system, including: generating environmental data of a vehicle; determining, by the autonomous driving system, a first control state based on the environmental data of the vehicle; determining, by a reference model, a second control state based on the environmental data, where the reference model defines at least one scenario each corresponding to a plurality of expected control states and a state switching condition, and in each of the expected control states corresponding to the scenario, an action of the vehicle in the scenario obeys a traffic rule; and determining the unexpected control state of the autonomous driving system by comparing the first control state with the second control state.

In a second aspect, embodiments of the present disclosure provide an apparatus including: a processor; and a memory coupled to the processor to store instructions, which when executed by the processor, cause the processor to perform operations, the operations including: generating environmental data of a vehicle; determining, by the autonomous driving system, a first control state based on the environmental data of the vehicle; determining, by a reference model, a second control state based on the environmental data, where the reference model defines at least one scenario each corresponding to a plurality of expected control states and a state switching condition, and in each of the expected control states corresponding to the scenario, an action of the vehicle in the scenario obeys a traffic rule; and determining the unexpected control state of the autonomous driving system by comparing the first control state with the second control state.

In a third aspect, embodiments of the present disclosure provide a non-transitory machine-readable medium having instructions stored therein, which when executed by a processor, cause the processor to perform operations, the operations including generating environmental data of a vehicle; determining, by the autonomous driving system, a first control state based on the environmental data of the vehicle; determining, by a reference model, a second control state based on the environmental data, where the reference model defines at least one scenario each corresponding to a plurality of expected control states and a state switching condition, and in each of the expected control states corresponding to the scenario, an action of the vehicle in the scenario obeys a traffic rule; and determining the unexpected control state of the autonomous driving system by comparing the first control state with the second control state.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Figure 1:
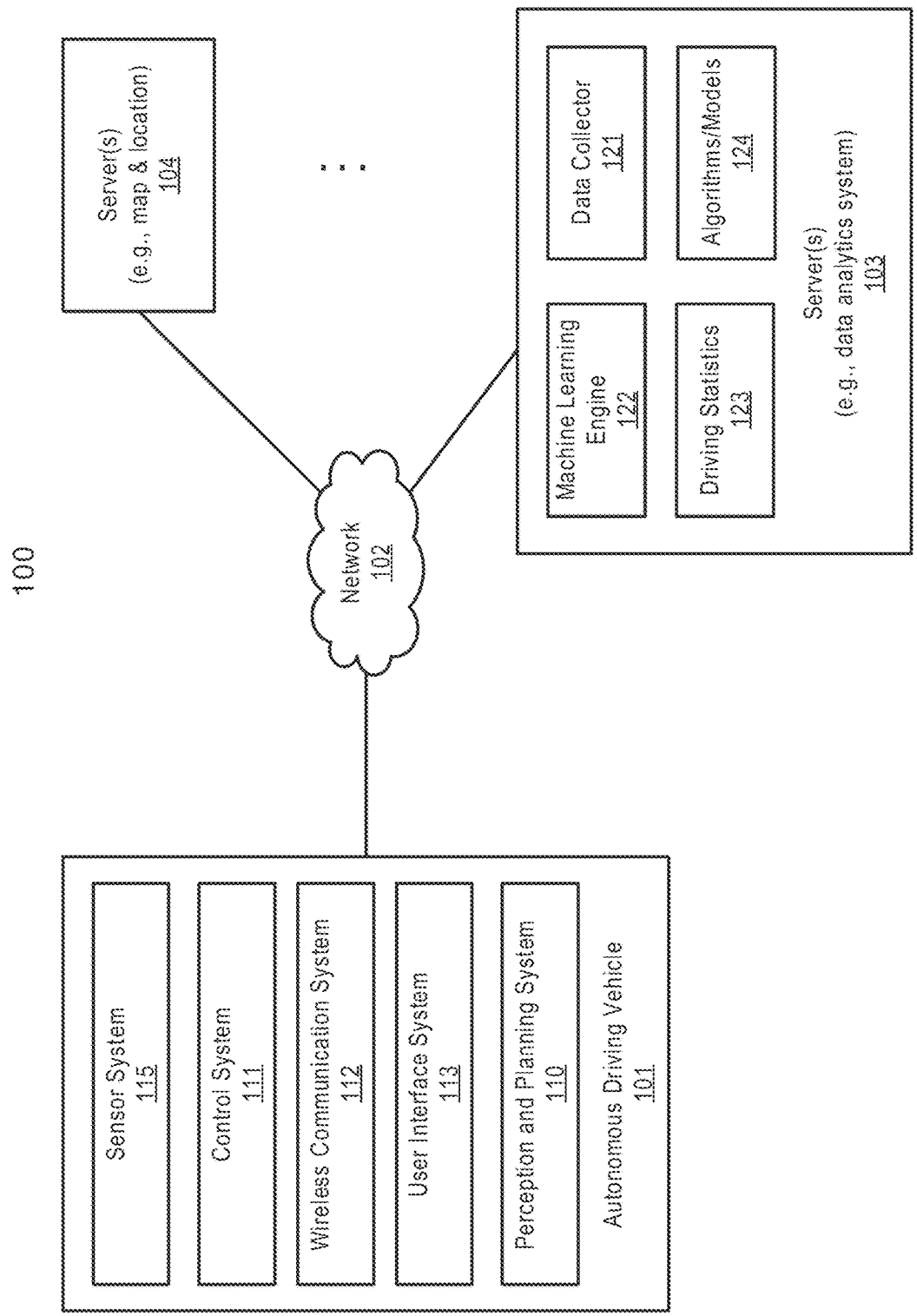
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
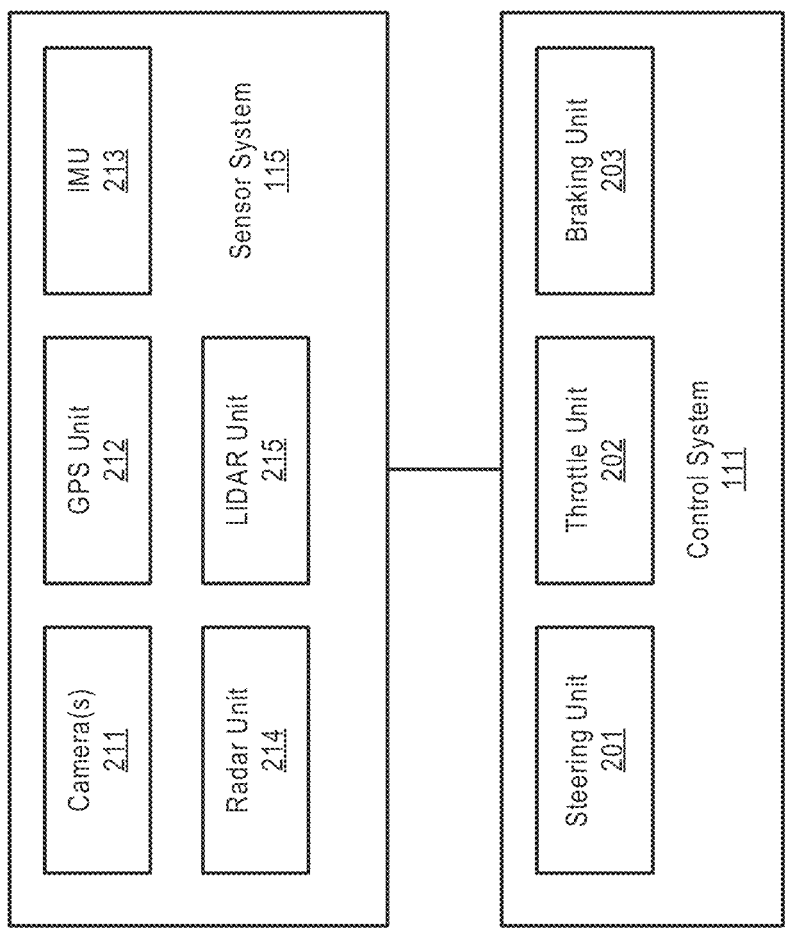
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Figure 3A:
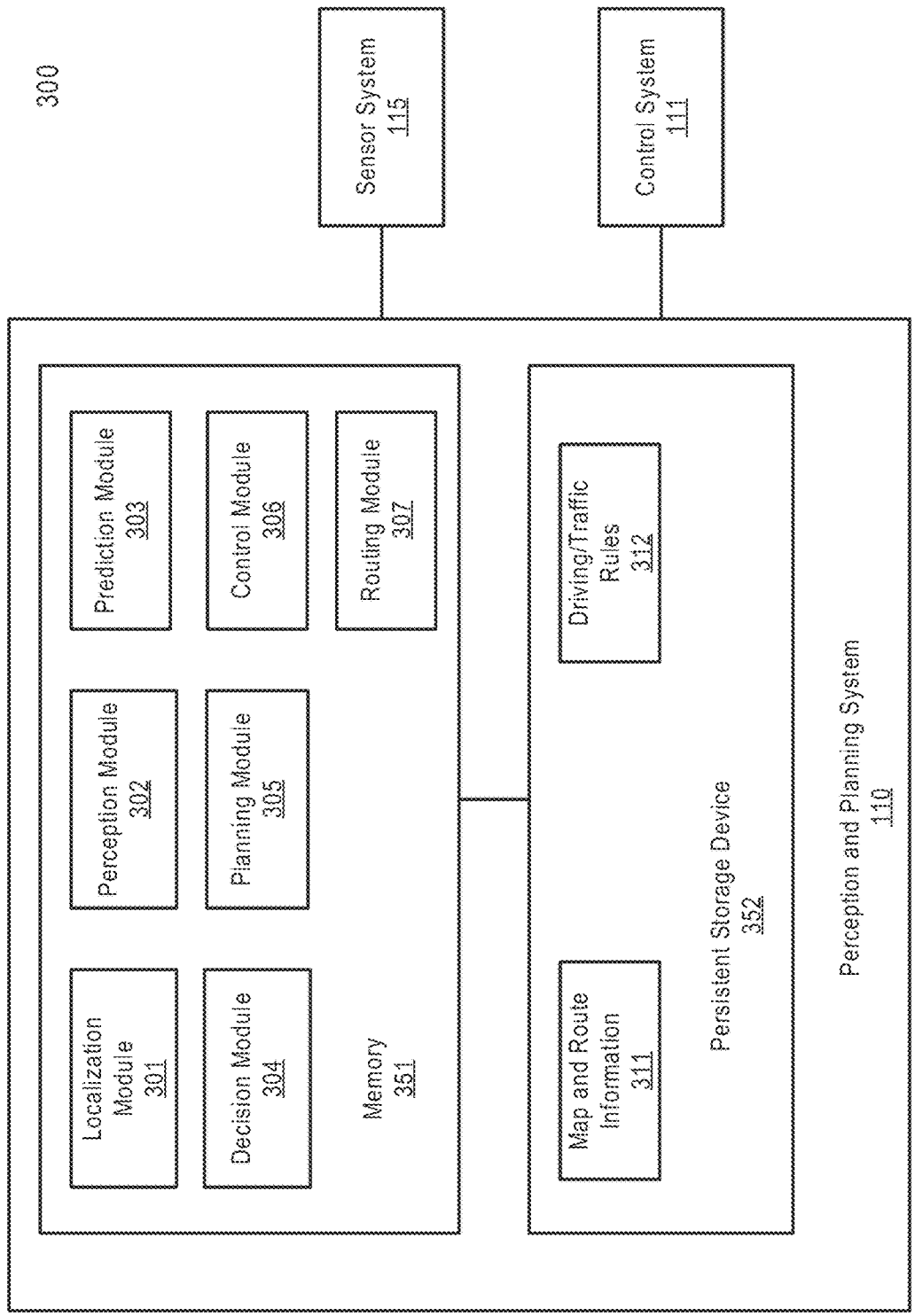
FIGS. 3A-3B are block diagrams illustrating an example of a perception and planning system used with an autonomous vehicle according to one embodiment.
Figure 3B:
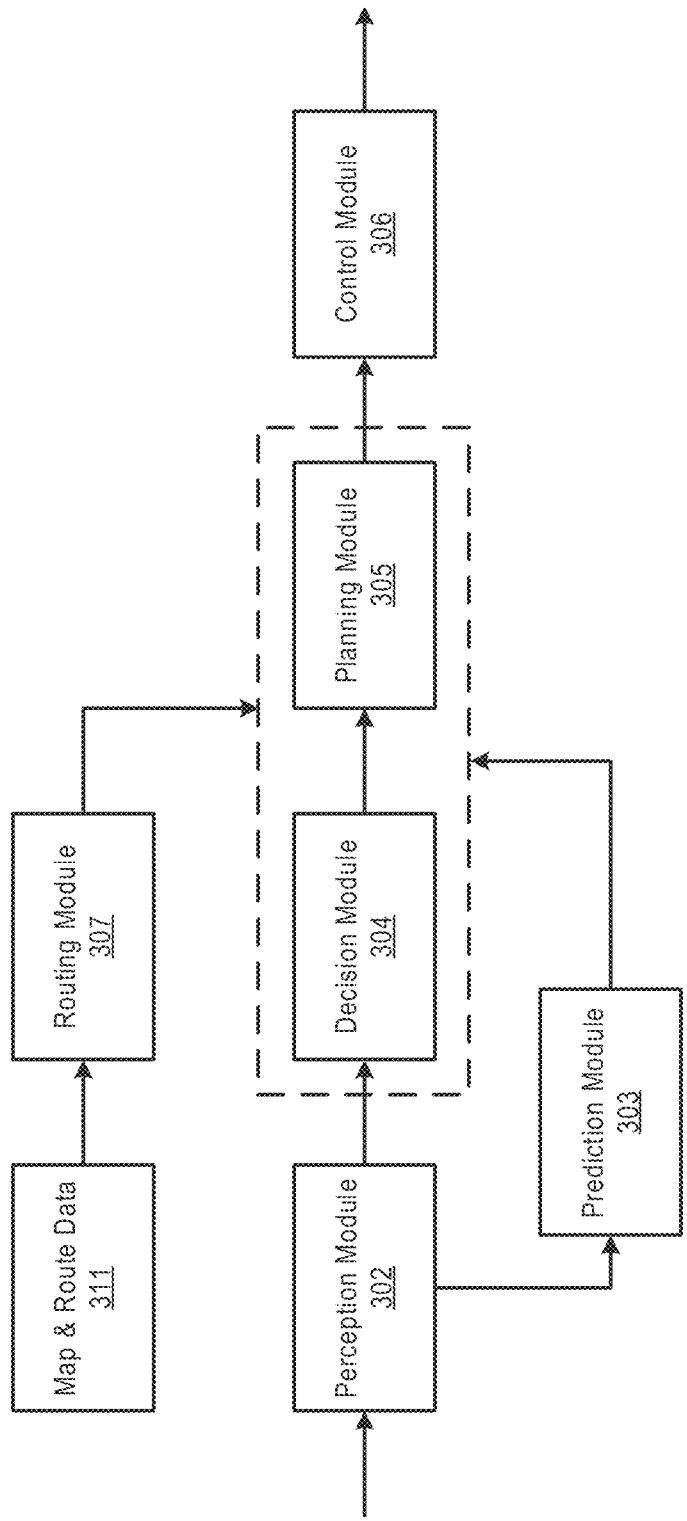

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface.

Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
FIG. 4 is a block diagram illustrating architecture of an autonomous driving system according to one embodiment.

FIG. 4 is a block diagram illustrating a system architecture for autonomous driving according to one embodiment. System architecture 400 may represent a system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Safety is the key to the successful delivery of the autonomous driving vehicle to the public transportation. Hence, road testing raises unbearable time cost. In addition, extreme traffic conditions are hard to reproduce in road testing, let alone subtle and dangerous corner cases. Under such circumstances, gaming engine-based 3D simulators have been leveraged, like SVL, CARLA, AirSim, Udacity, et al., to develop more efficient virtual safety testing methods. Moreover, automated analysis methods have actively adopted these virtual testing approaches as the testbeds to reason about the autonomous driving safety problems.

A virtual test case often appears as a configuration file that consists of static settings and dynamic settings. Static settings include the globally non-changing data under a simulation, like the high-definition map, the sensors, the autonomous vehicle model, the driving destination, etc. Dynamic settings contain the parameters whose values are changeable in simulation, such as the position of a surrounding nonplayer character (NPC) car, the traffic light signals, the weather and the light conditions, etc. Autonomous driving testing specialists need to handcraft hundreds of virtual test cases to assess the vehicle behaviors under critical scenarios. Recent works further applied fuzz testing to mutate the dynamic virtual test case data hence automatically generating a great many new test cases that drastically ease the human efforts. Nevertheless, practical limitations that hinder the extensive use of those automated analysis methods are observed.

First, test cases from autonomous driving test generation techniques primarily chase vehicle collisions in simulation or higher quantitative metric coverage, rather than detecting other improper traffic rule violations. Also, unsuitable data acquisition mode in autonomous driving analysis may introduce imprecision even wrong results. Third, certain autonomous driving systems might be only compatible with specific simulators. For example, though SVL supports no driving data inquiries on a running simulation, it is at present the only public simulator for latest Apollo 6.0. One may alternatively modify Apollo code to complement the deficiency in SVL. However, such intrusive and costly effort unlikely works on other closed-source autonomous driving systems.

In some embodiments of the disclosure, a non-intrusive conformance checking method that complements related techniques by passively checking the existence of unexpected behaviors is proposed. In some embodiments, the aforementioned limitations are tackled by the method according to some embodiments in threefold improvements. The method according to some embodiments adopts the idea of conformance testing for checking the inconsistent driving states thus pinpointing the traffic rule violations in autonomous driving simulation. Users can freely define the pluggable models for checking interested traffic rule violations in a trace analysis approach. Also, the data exchange channel between simulator and autonomous driving system for complete data acquisition is monitored, thereby avoiding the latency and with the environment data from simulator and the driving state data from the autonomous driving system, the violation detection problem is converted into a trace analysis problem.

Figure 5:
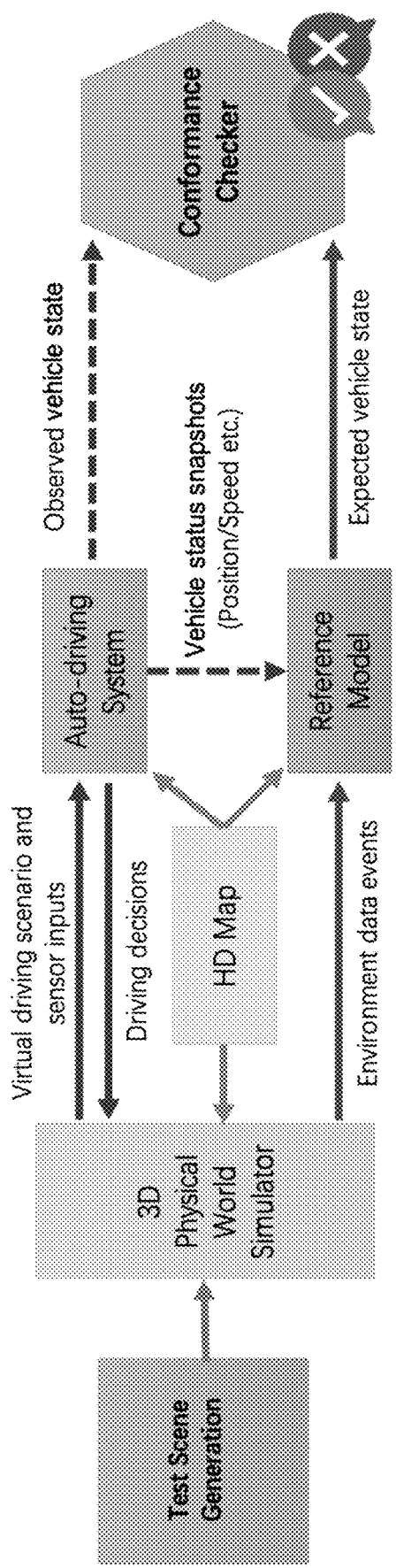
FIG. 5 an architecture of a system for detecting an unexpected control state of an autonomous driving system according to one embodiment.

FIG. 5 illustrates an architecture of a system for detecting an unexpected control state of an autonomous driving system. As shown in FIG. 5, in one embodiment, given a test case from the leftmost test scene generation, a 3D simulator starts simulation with an autonomous driving system in bidirectional communications. The simulator constructs the driving scenario and sensor inputs for the backend autonomous driving system, and the latter computes consequent driving decisions for simulator visualization. The reference model is a vehicle execution model whose states always obey the driving regulations or traffic rules. In one embodiment, the reference model depicts the ideal driving states under the environment data and the vehicle status snapshot. The rightmost conformance checker determines whether the observed vehicle state in simulation conforms with the expected state from the reference model execution.

Figure 6:
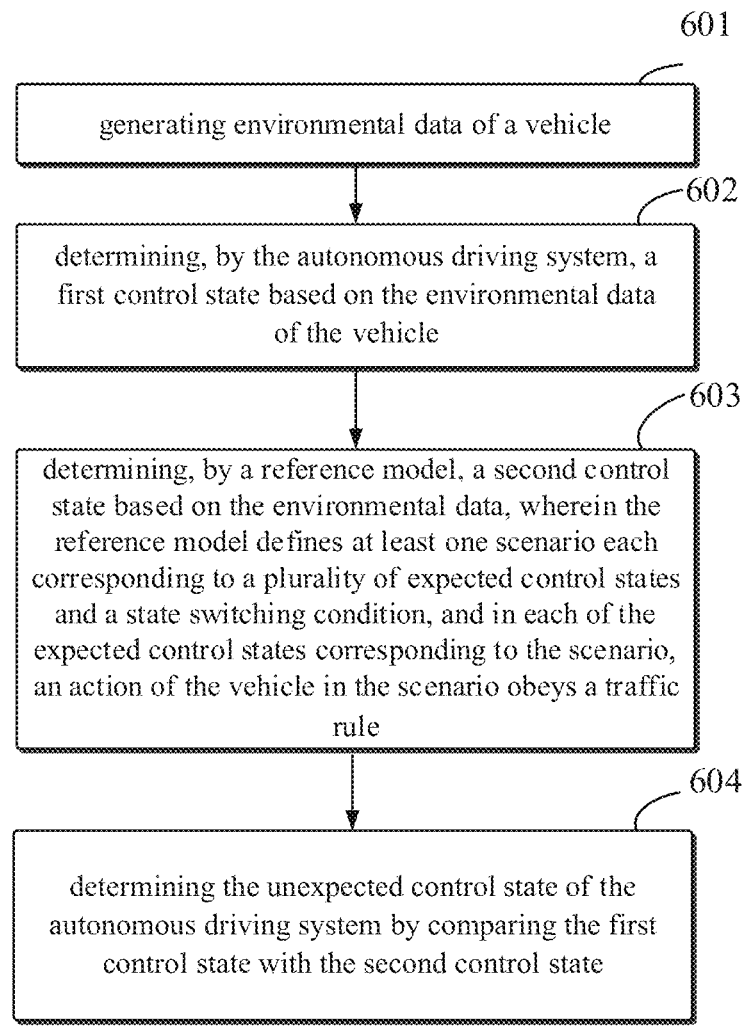
FIG. 6 illustrates a method for detecting an unexpected control state of an autonomous driving system according to one embodiment of the disclosure.

FIG. 6 illustrates a method for detecting an unexpected control state of an autonomous driving system according to one embodiment of the disclosure. The method includes steps 601 to 604.

Step 601 includes generating environmental data of a vehicle.

In one embodiment, the environmental data may be generated by a simulator as the sensor data provided by sensor system 115, and localization information obtained by localization module 301.

Step 602 includes determining, by the autonomous driving system, a first control state based on the environmental data of the vehicle. In one embodiment, the control module 306 of autonomous driving system determines a first control state of the vehicle, such as stopping, accelerating, cruising, decelerating, etc.

Step 603 includes determining, by a reference model, a second control state based on the environmental data, where the reference model defines at least one scenario each corresponding to a plurality of expected control states and a state switching condition, and in each of the expected control states corresponding to the scenario, an action of the vehicle in the scenario obeys a traffic rule.

In one embodiment, a given environmental data is input to the autonomous driving vehicle and the reference model respectively.

TABLE 1 scenarios defined by the reference model

| Scenarios | Scenario Description |
| --- | --- |
| TrafficLight-S | The vehicle (e.g., ego car) goes into an intersection with a traffic light |
| TrafficLight-S-O | The vehicle goes into an intersection with a traffic light and an obstacle |
| TrafficLight-L | The vehicle turns left at a protected traffic light |
| TrafficLight-L-U | The vehicle turns left at an unprotected traffic light |
| TrafficLight-R | The vehicle turns right at a protected traffic light. |
| TrafficLight-R-NRR | The vehicle turns right at a no-right-turn-on-red traffic light |
| LaneFollow | The vehicle drives on the lane and brakes for cut-in vehicles |
| LaneBorrow | The vehicle tries to borrow the left lane due to traffic jam |
| StopSign | The vehicle reaches a stop sign and leave accordingly |

In one embodiment, continuous autonomous driving behaviors are classified into a set of scenarios which are shown in Table 1. Then, control states in each scenario are modeled by a finite state machine (FSM). Each state machine M is a tuple (S, $s_0$, $s_c$, $\mathcal{V}$, $\mathcal{T}$, I) where:

S is a finite set of control states under a scenario;
$s_0$ is the initial control state of M;
I is a finite set of input variables;
$\mathcal{V}$ presents the finite set of state variables;
C presents the finite set of state transition predicates;
$\mathcal{A}$ is an alphabet of actions where $\alpha \in \mathcal{A}$ acts over input $i \in I$ and state variable $v \in \mathcal{V}$;
$\mathcal{T} \subseteq S \times S$ is a finite set of transitions: t=(s, i, $a_s$, c, s') $\in \mathcal{T}$ represents a transition from s to s' guarded by predicate $c \in C$; $a_s \in \mathcal{A}$ is the action associated with s, and $i \in I$ is the input. t can also be denoted as $$s \xrightarrow{i, a_S, c} s'.$$

In one embodiment, an action obeying the traffic rule comprising: stopping before a stop line when the traffic light turns red, not pressing a double-yellow line, not exceeding a limited speed, and so on. The traffic rule may be determined based on a local traffic rule released by a government organization, such as Department of Motor Vehicles.

Figure 7:
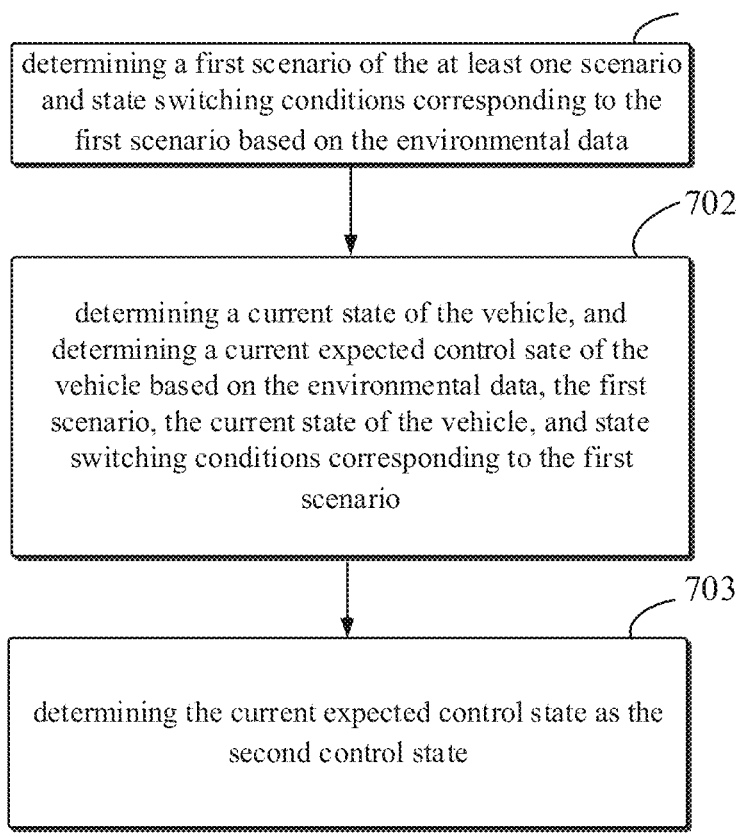
FIG. 7 illustrates a detailed description of step 603 shown in FIG. 6 according to one embodiment.

In one embodiment, step 603 includes steps 701 to 703 as shown in FIG. 7.

Step 701 includes determining a first scenario of the at least one scenario and state switching conditions corresponding to the first scenario based on the environmental data.

Figure 8:
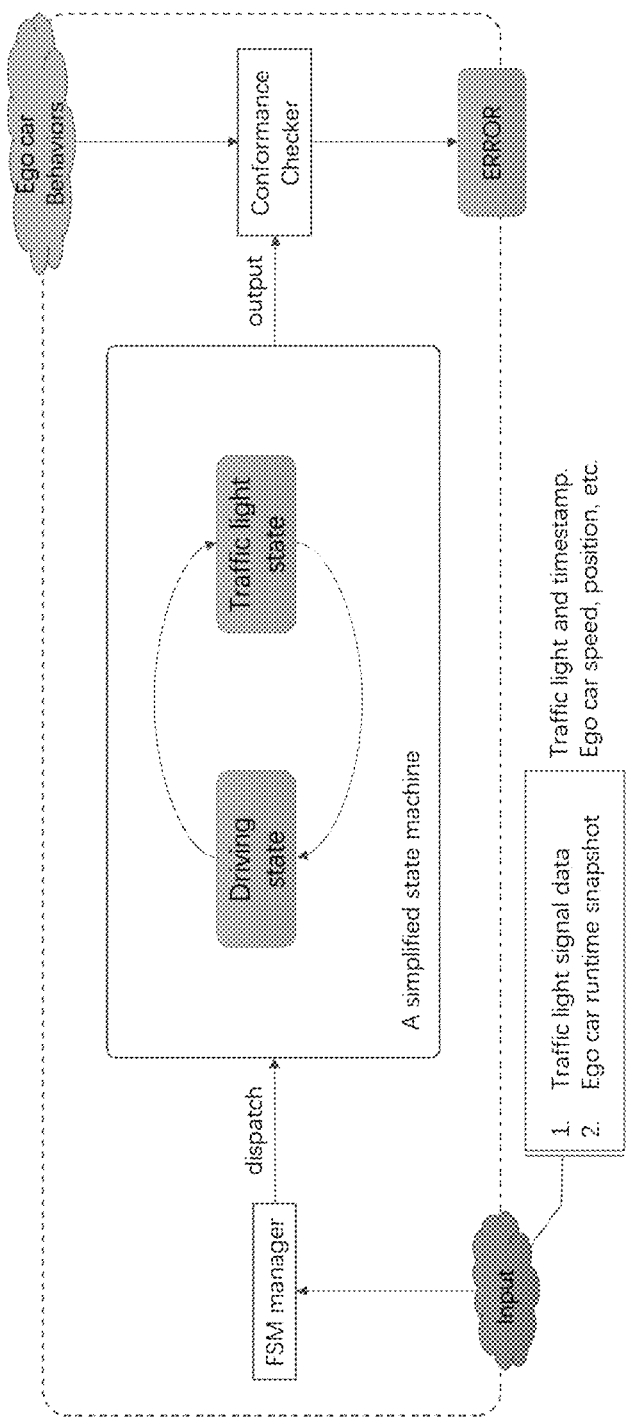
FIG. 8 illustrates a system in which the reference model is a state machine according to one embodiment.

In one embodiment, the first scenario is the vehicle going into an intersection with a traffic light, and expected control states corresponding to the first scenario includes a driving state and a traffic light state. FIG. 8 illustrates a system in which the reference model is a state machine of the first scenario.

Step 702 includes determining a current state of the vehicle, and determining a current expected control sate of the vehicle based on the environmental data, the first scenario, the current state of the vehicle, and state switching conditions corresponding to the first scenario.

In one embodiment, the current state of the vehicle includes a current speed and a current position of the vehicle. In one embodiment, the current state of the vehicle is determined based on a snapshot acquired by the autonomous driving system. In one embodiment, the current expected control state of the vehicle is determined using the state machine for the first scenario based on the environmental data, the current state of the vehicle, and state switching conditions corresponding to the first scenario.

Step 703 includes determining the current expected control state as the second control state.

Step 605 includes determining the unexpected control state of the autonomous driving system by comparing the first control state with the second control state.

In one embodiment, in response to determining that the first control state is not consistent with or not identical to the second control state, the first control state is determined as the unexpected control state. In one embodiment, in response to determining that the second control state is stopping the vehicle while the first control state is cruising, moving or accelerating, the first control state is determined as the unexpected control state.

Figure 9:
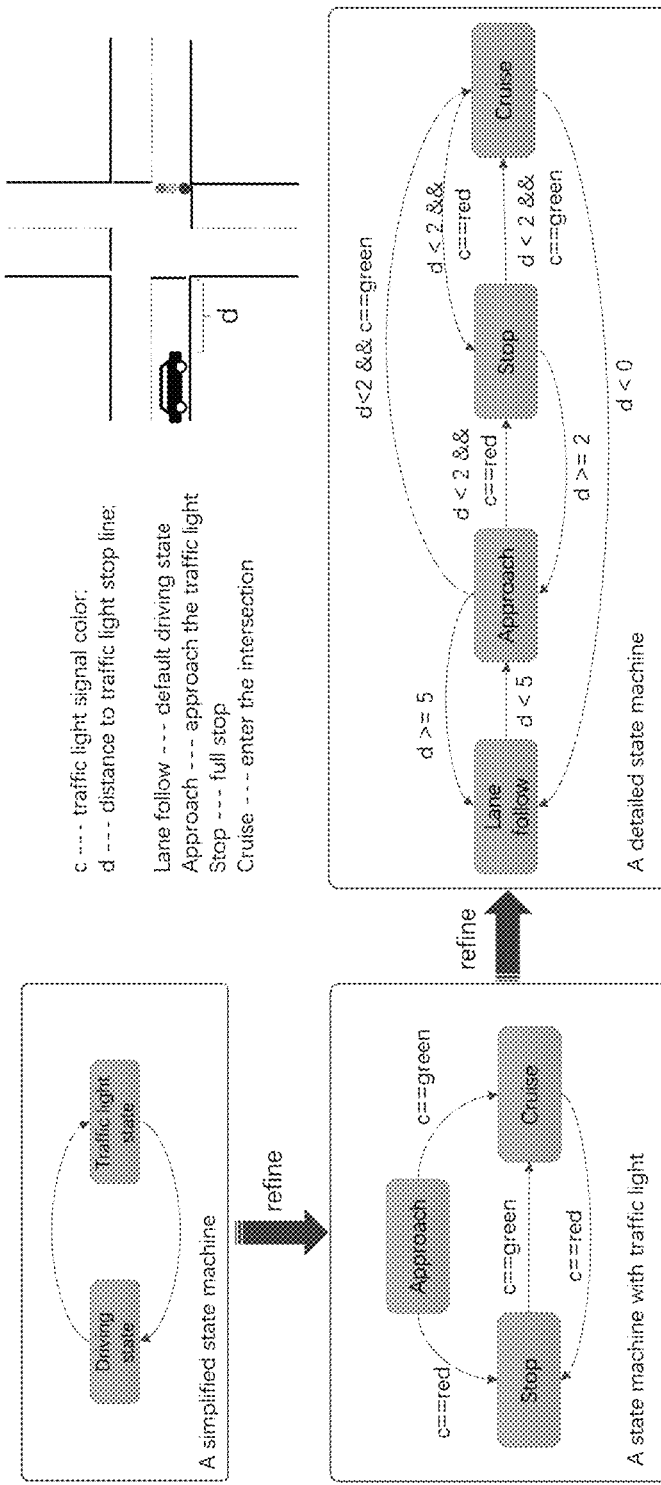
FIG. 9 illustrates example state machines according to one embodiment.

In one embodiment, the state machine shown in FIG. 8 is refined as in FIG. 9. In one embodiment, the driving state includes a first driving state of cruising to the intersection and a second driving state of approaching a stop line at the intersection, and the traffic light state includes a first traffic light state of stop moving, where the state switching conditions corresponding to the first scenario include: a first state switching condition that the traffic light turns green, and a second state switching condition that the traffic light turns red.

Figure 10:
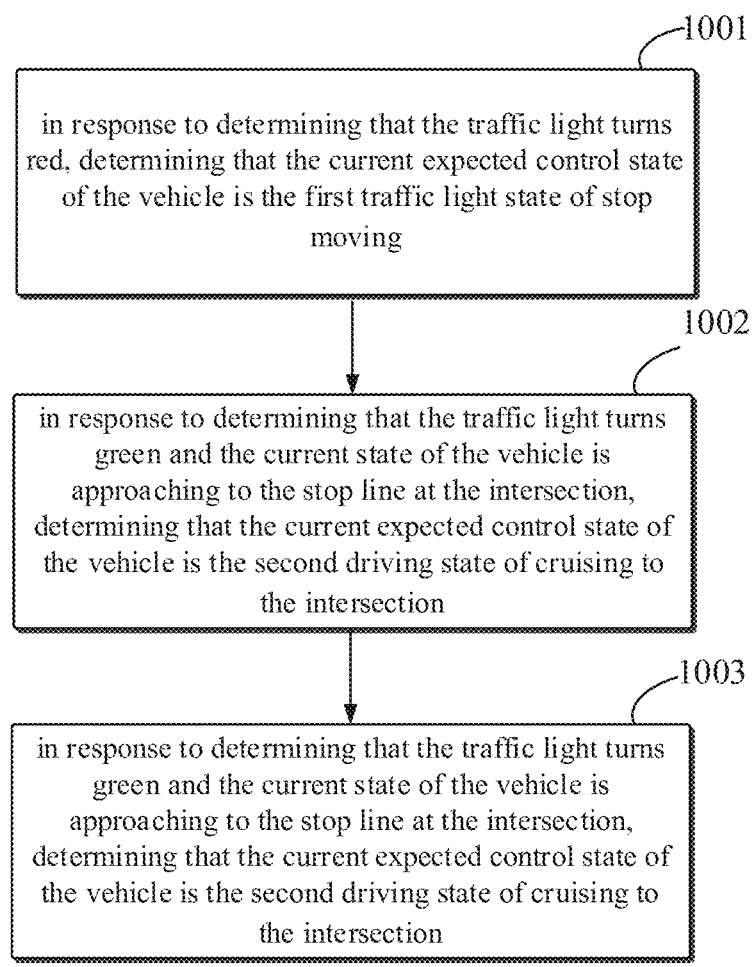
FIG. 10 illustrates a detailed description of step 702 as shown in FIG. 7 according to one embodiment.
Figure 11:
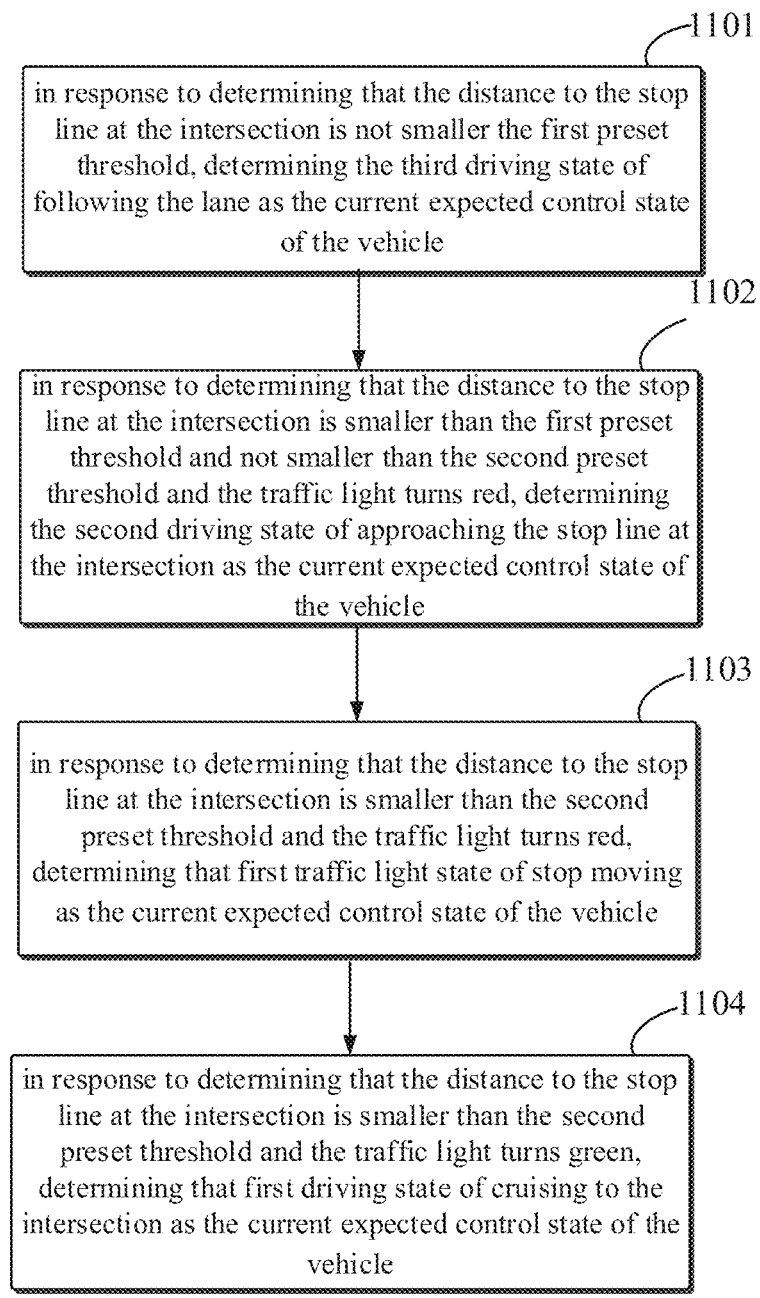
FIG. 11 illustrates a detailed description of step 702 as shown in FIG. 7 according to another embodiment.

In one embodiment, step 702 includes steps 1001 to 1003 as shown in FIG. 10.

Step 1001 includes in response to determining that the traffic light turns red, determining that the current expected control state of the vehicle is the first traffic light state of stop moving. Step 1002 includes in response to determining that the traffic light turns green and the current state of the vehicle is approaching to the stop line at the intersection, determining that the current expected control state of the vehicle is the second driving state of cruising to the intersection. Step 1003 includes in response to determining that the traffic light turns green and the current state of the vehicle is stop moving, determining that the current expected control state of the vehicle is the second driving state of cruising to the intersection.

In one embodiment, the driving state further includes a third driving state of following a lane, and the state switching condition includes: a third switching condition that a distance to the stop line at the intersection is smaller a first preset threshold, and a fourth switching condition that the distance to the stop line at the intersection is smaller than a second preset threshold.

In one embodiment, step 702 includes steps 1101 to 1104.

Step 1101 includes in response to determining that the distance to the stop line at the intersection is not smaller the first preset threshold, determining the third driving state of following the lane as the current expected control state of the vehicle.

Step 1102 includes in response to determining that the distance to the stop line at the intersection is smaller than the first preset threshold and not smaller than the second preset threshold and the traffic light turns red, determining the second driving state of approaching the stop line at the intersection as the current expected control state of the vehicle.

In one embodiment, the second preset threshold is smaller than the first preset threshold. For example, the second preset threshold is 2 meters, and the first preset threshold is 5 meters. The first preset threshold and the second preset threshold may be any values as needed and are not limited to 5 meters and 2 meter as shown in FIG. 9.

Step 1103 includes in response to determining that the distance to the stop line at the intersection is smaller than the second preset threshold and the traffic light turns red, determining that first traffic light state of stop moving as the current expected control state of the vehicle.

Step 1104 includes in response to determining that the distance to the stop line at the intersection is smaller than the second preset threshold and the traffic light turns green, determining that the first driving state of cruising to the intersection as the current expected control state of the vehicle.

Figure 12:
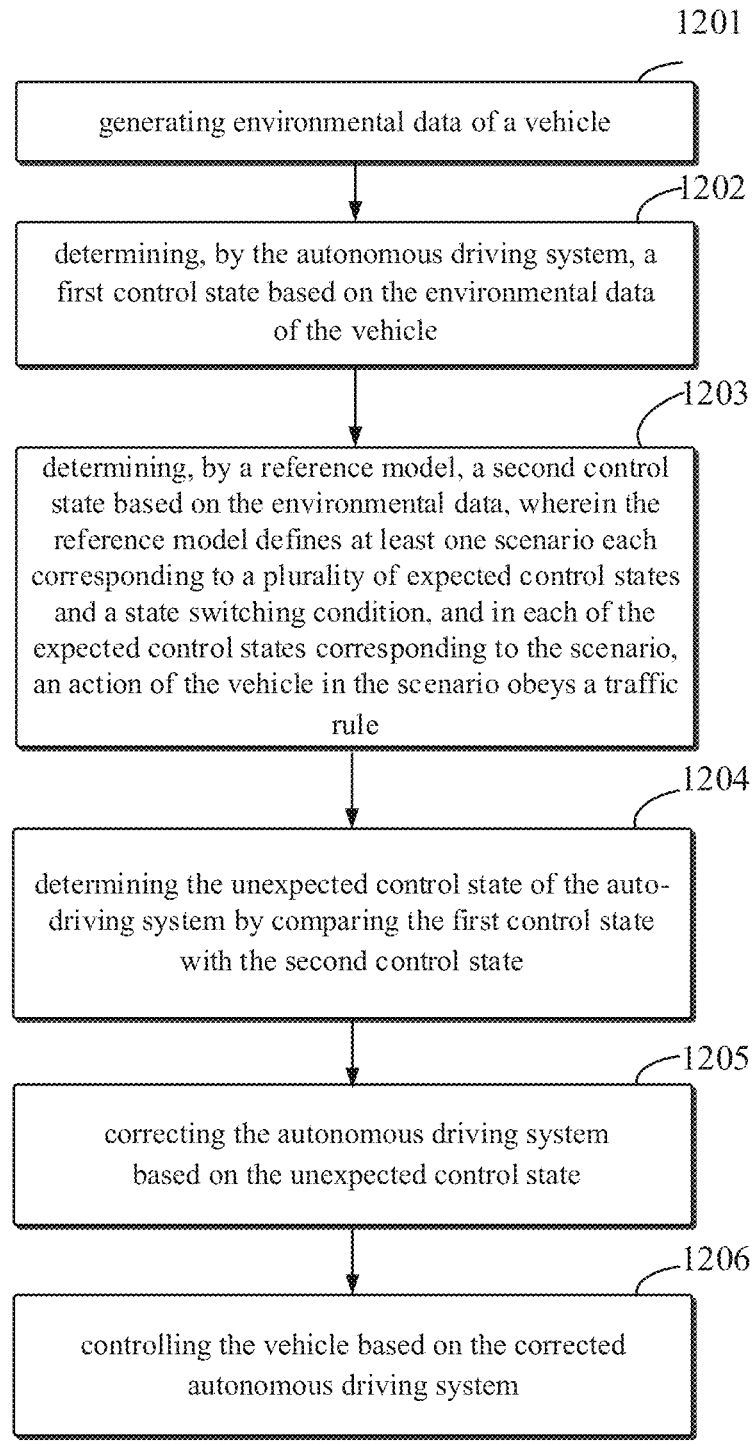
FIG. 12 illustrates a method for detecting an unexpected control state of an autonomous driving system according to another embodiment.

FIG. 12 illustrates a method for detecting an unexpected control state of an autonomous driving system according to another embodiment. Steps 1201 to 1204 are the same as steps 601 to 604. The method further includes steps 1205 and 1206.

Step 1205 includes correcting the autonomous driving system based on the unexpected control state.

In one embodiment, in response to determining an unexpected control state, the autonomous driving system is checked to find an inappropriate portion such as inappropriate program codes, and this portion is corrected to comply with the expected control state outputted by the reference model.

Step 1206 includes controlling the vehicle based on the corrected autonomous driving system.

In one embodiment, the corrected autonomous driving system is used to control the vehicle such that the unexpected control state is avoided.

Figure 13:
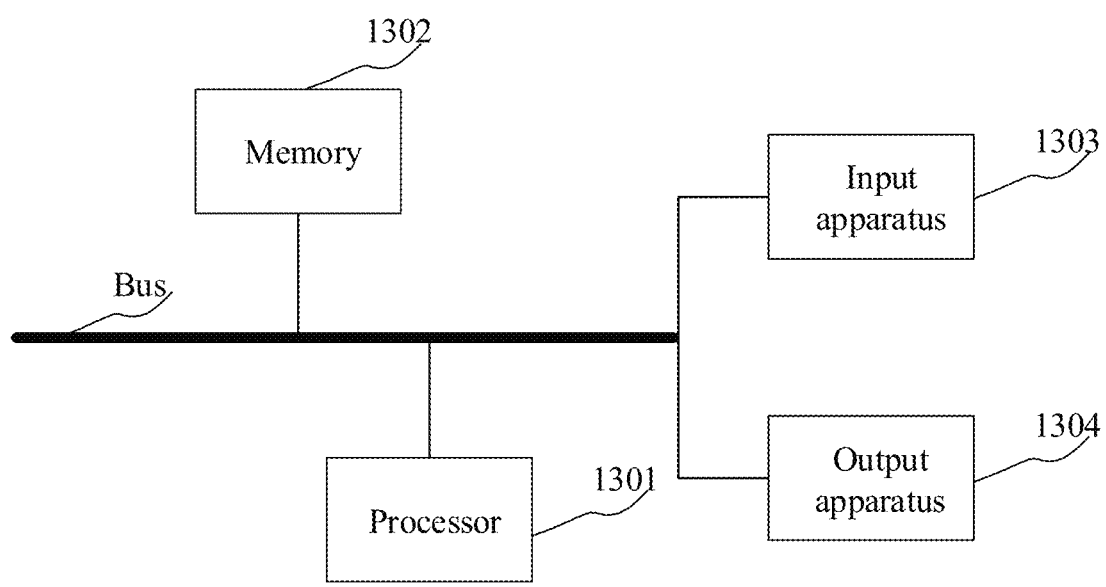
FIG. 13 illustrates an apparatus for detecting an unexpected control state of an autonomous driving system according to one embodiment.

FIG. 13 illustrates an apparatus for detecting an unexpected control state of an autonomous driving system according to one embodiment. The apparatus includes: one or more processors 1301, a memory 1302, and interfaces for connecting various components, including high-speed interfaces and low-speed interfaces. The various components are connected to each other using different buses, and may be mounted on a common motherboard or in other methods as needed. The processor may process instructions executed within the apparatus, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of apparatuses may be connected, and the apparatuses provide some necessary operations, for example, as a server array, a set of blade servers, or a multi-processor system. In FIG. 13, processor 1301 is used as an example.

The memory 1302 is a non-transitory computer readable storage medium provided by some embodiments of the present disclosure. The memory stores instructions executable by at least one processor, so that the at least one processor performs the method for determining a destination on a map according to some embodiments of disclosure. The non-transitory computer readable storage medium of some embodiments of the present disclosure stores computer instructions for causing a computer to perform the method for detecting an unexpected control state of an autonomous driving system according to some embodiments of disclosure.

The memory 1302, as a non-transitory computer readable storage medium, may be used to store non-transitory software programs, non-transitory computer executable programs and modules, such as program instructions/modules corresponding to the method for detecting an unexpected control state of an autonomous driving system according to some embodiments of disclosure. The processor 1301 executes the non-transitory software programs, instructions, and modules stored in the memory 1302 to execute various functional applications and data processing of the server, that is, to implement the method for determining a destination on a map according to some embodiments of disclosure.

The memory 1302 may include a storage program area and a storage data area, where the storage program area may store an operating system and at least one function required application program; and the storage data area may store data created by the use of the apparatus of the method for detecting an unexpected control state of an autonomous driving system according to some embodiments of disclosure. In addition, the memory 1302 may include a high-speed random access memory, and may also include a non-transitory memory, such as at least one magnetic disk storage device, a flash memory device, or other non-transitory solid-state storage devices. In some embodiments, the memory 1302 may optionally include memories remotely disposed with respect to the processor 1301, and these remote memories may be connected to the apparatus of the method for detecting an unexpected control state of an autonomous driving system according to some embodiments of disclosure. Examples of the above network include but are not limited to the Internet, intranet, local area network, mobile communication network, and combinations thereof.

The apparatus performing the method for determining a destination on a map according to some embodiments of disclosure may further include: an input apparatus 1303 and an output apparatus 1304. The processor 1301, the memory 1302, the input apparatus 1303, and the output apparatus 1304 may be connected through a bus or in other methods. In FIG. 13, connection through the bus is used as an example.

The input apparatus 1303 may receive input digital or character information, and generate key signal inputs related to user settings and function control of the apparatus of the method for learning a knowledge representation, such as touch screen, keypad, mouse, trackpad, touchpad, pointing stick, one or more mouse buttons, trackball, joystick and other input apparatuses. The output apparatus 1304 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

It should be understood that the various forms of processes shown above may be used to reorder, add, or delete steps. For example, the steps described in some embodiments of the present disclosure may be performed in parallel, sequentially, or in different orders. As long as the desired results of the technical solution disclosed in some embodiments of the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

The invention claimed is:

1. A computer-implemented method for detecting an unexpected control state of an autonomous driving system, the method comprising:
generating environmental data of a vehicle;
determining, by the autonomous driving system, a first control state based on the environmental data;
determining, by a reference model, a second control state based on the environmental data, wherein the reference model defines at least one scenario each corresponding to a plurality of expected control states and a state switching condition, and in each of the expected control states corresponding to the scenario, an action of the vehicle in the scenario obeys a traffic rule;
determining the unexpected control state of the autonomous driving system by comparing the first control state with the second control state;
correcting the autonomous driving system based on the unexpected control state; and
controlling the vehicle based on the corrected autonomous driving system, wherein determining by the reference model the second control state based on the environmental data comprises:
determining a first scenario of the at least one scenario and state switching conditions corresponding to the first scenario based on the environmental data;
determining a current state of the vehicle;
determining a current expected control state of the vehicle based on the environmental data, the first scenario, the current state of the vehicle, and state switching conditions corresponding to the first scenario; and
determining the current expected control state as the second control state, wherein in the first scenario, the vehicle goes into an intersection with a traffic light, and the plurality of expected control states corresponding to the first scenario comprises a driving state, wherein the driving state further comprises a second driving state of approaching a stop line at the intersection and a third driving state of following a lane, and the state switching condition comprises: a first state switching condition that the traffic light turns green, a second state switching condition that the traffic light turns red, a third switching condition that a distance to the stop line at the intersection is smaller than a first preset threshold, and a fourth switching condition that the distance to the stop line at the intersection is smaller than a second preset threshold, and determining the current expected control state of the vehicle based on the environmental data, the first scenario, the current state of the vehicle, and the state switching conditions corresponding to the first scenario comprises:

in response to determining that the distance to the stop line at the intersection is not smaller than the first preset threshold, determining the third driving state of following the lane as the current expected control state of the vehicle; and in response to determining that the distance to the stop line at the intersection is smaller than the first preset threshold and not smaller than the second preset threshold and the traffic light turns red, determining the second driving state of approaching the stop line at the intersection as the current expected control state of the vehicle.

2. The method of claim 1, wherein the driving state comprises a first driving state of cruising to the intersection and the plurality of expected control states comprises a first traffic light state of stop moving.

3. The method of claim 2, wherein determining the current expected control state of the vehicle based on the environmental data, the first scenario, the current state of the vehicle, and the state switching conditions corresponding to the first scenario comprises:

in response to determining that the distance to the stop line at the intersection is smaller than the second preset threshold and the traffic light turns red, determining that the first traffic light state of stop moving as the current expected control state of the vehicle; and in response to determining that the distance to the stop line at the intersection is smaller than the second preset threshold and the traffic light turns green, determining that the first driving state of cruising to the intersection as the current expected control state of the vehicle.

4. The method of claim 1, wherein the at least one scenario further comprises at least one of a second scenario, a third scenario, a fourth scenario, or a fifth scenario, wherein in the second scenario, the vehicle turns left or right at the intersection with the traffic light; in the third scenario, the vehicle drives on a lane and brakes for a cut-in vehicle; in the fourth scenario, the vehicle tries to borrow a left lane due to a traffic jam; and in the fifth scenario, the vehicle reaches a stop sign and then leaves.

5. The method of claim 1, wherein the environmental data is generated by a simulator, and a current state of the vehicle is determined based on a snapshot acquired by the autonomous driving system.

6. An apparatus, comprising:
a processor; and
a memory storing instructions, which when executed by the processor, cause the processor to perform operations, the operations including:
generating environmental data of a vehicle;
determining, by an autonomous driving system, a first control state based on the environmental data;
determining, by a reference model, a second control state based on the environmental data, wherein the reference model defines at least one scenario each corresponding to a plurality of expected control states and a state switching condition, and in each of the expected control states corresponding to the scenario, an action of the vehicle in the scenario obeys a traffic rule;

determining an unexpected control state of the autonomous driving system by comparing the first control state with the second control state;
correcting the autonomous driving system based on the unexpected control state; and
controlling the vehicle based on the corrected autonomous driving system, wherein determining by the reference model the second control state based on the environmental data comprises: determining a first scenario of the at least one scenario and state switching conditions corresponding to the first scenario based on the environmental data; determining a current state of the vehicle; determining a current expected control state of the vehicle based on the environmental data, the first scenario, the current state of the vehicle, and state switching conditions corresponding to the first scenario; and determining the current expected control state as the second control state, wherein the first scenario, the vehicle goes into an intersection with a traffic light, and the plurality of expected control states corresponding to the first scenario comprises a driving state, wherein the driving state further comprises a second driving state of approaching a stop line at the intersection and a third driving state of following a lane, and the state switching condition comprises: a first state switching condition that the traffic light turns green, a second state switching condition that the traffic light turns red, a third switching condition that a distance to the stop line at the intersection is smaller than a first preset threshold, and a fourth switching condition that the distance to the stop line at the intersection is smaller than a second preset threshold, and determining the current expected control state of the vehicle based on the environmental data, the first scenario, the current state of the vehicle, and the state switching conditions corresponding to the first scenario comprises:

in response to determining that the distance to the stop line at the intersection is not smaller than the first preset threshold, determining the third driving state of following the lane as the current expected control state of the vehicle; and in response to determining that the distance to the stop line at the intersection is smaller than the first preset threshold and not smaller than the second preset threshold and the traffic light turns red, determining the second driving state of approaching the stop line at the intersection as the current expected control state of the vehicle.

7. The apparatus of claim 6, wherein the driving state comprises a first driving state of cruising to the intersection and the plurality of expected control states comprises a first traffic light state of stop moving.

8. The apparatus of claim 6, wherein determining by the reference model the second control state based on the environmental data comprises:

in response to determining that the distance to the stop line at the intersection is smaller than the second preset threshold and the traffic light turns red, determining that the first traffic light state of stop moving as the current expected control state of the vehicle; and in response to determining that the distance to the stop line at the intersection is smaller than the second preset threshold and the traffic light turns green, determining that the first driving state of cruising to the intersection as the current expected control state of the vehicle.

9. The apparatus of claim 6, wherein the at least one scenario further comprises at least one of a second scenario, a third scenario, a fourth scenario, or a fifth scenario, wherein in the second scenario, the vehicle turns left or right at the intersection with the traffic light; in the third scenario, the vehicle drives on a lane and brakes for a cut-in vehicle; in the fourth scenario, the vehicle tries to borrow a left lane due to a traffic jam; and in the fifth scenario, the vehicle reaches a stop sign and then leaves.

10. The apparatus of claim 6, wherein the environmental data is generated by a simulator, and a current state of the vehicle is determined based on a snapshot acquired by the autonomous driving system.

11. A non-transitory machine-readable medium having instructions stored therein, which when executed by a processor, cause the processor to perform operations, the operations comprising:
  generating environmental data of a vehicle;
  determining, by the autonomous driving system, a first control state based on the environmental data of the vehicle;
  determining, by a reference model, a second control state based on the environmental data, wherein the reference model defines at least one scenario each corresponding to a plurality of expected control states and a state switching condition, and in each of the expected control states corresponding to the scenario, an action of the vehicle in the scenario obeys a traffic rule;
  determining an unexpected control state of the autonomous driving system by comparing the first control state with the second control state;
  correcting the autonomous driving system based on the unexpected control state; and
  controlling the vehicle based on the corrected autonomous driving system,
  wherein determining by the reference model the second control state based on the environmental data comprises: determining a first scenario of the at least one scenario and state switching conditions corresponding to the first scenario based on the environmental data; determining a current state of the vehicle; determining a current expected control state of the vehicle based on the environmental data, the first scenario, the current state of the vehicle, and state switching conditions corresponding to the first scenario; and determining the current expected control state as the second control state, wherein in the first scenario, the vehicle goes into an intersection with a traffic light, and the plurality of expected control states corresponding to the first scenario comprises a driving state,
  wherein the driving state further comprises a second driving state of approaching a stop line at the intersection and a third driving state of following a lane, and the state switching condition comprises: a first state switching condition that the traffic light turns green, a second state switching condition that the traffic light turns red, a third switching condition that a distance to the stop line at the intersection is smaller than a first preset threshold, and a fourth switching condition that the distance to the stop line at the intersection is smaller than a second preset threshold, and determining the current expected control state of the vehicle based on the environmental data, the first scenario, the current state of the vehicle, and the state switching conditions corresponding to the first scenario comprises:
  in response to determining that the distance to the stop line at the intersection is not smaller than the first preset threshold, determining the third driving state of following the lane as the current expected control state of the vehicle; and
  in response to determining that the distance to the stop line at the intersection is smaller than the first preset threshold and not smaller than the second preset threshold and the traffic light turns red, determining the second driving state of approaching the stop line at the intersection as the current expected control state of the vehicle.

\* \* \* \* \*